United States Patent [19]

Makino

[11] Patent Number: 5,072,250

[45] Date of Patent: Dec. 10, 1991

[54] AUTOFOCUS APPARATUS

[75] Inventor: Misao Makino, Hachiouji, Japan

[73] Assignee: Kowa Company Ltd., Japan

[21] Appl. No.: 534,767

[22] Filed: Jun. 7, 1990

[30] Foreign Application Priority Data

Jun. 8, 1989 [JP] Japan .................................. 1-144216

[51] Int. Cl.$^5$ ............................................. G03B 13/00
[52] U.S. Cl. ...................................... 354/402; 358/227
[58] Field of Search ............................... 354/400–409;
358/227; 250/201, 204, 201.1, 201.2, 201.7, 201.8

[56] References Cited

U.S. PATENT DOCUMENTS 4,872,058 10/1989 Baba et al. ............................ 358/227

Primary Examiner—L. T. Hix
Assistant Examiner—David M. Gray
Attorney, Agent, or Firm—Bruce L. Adams; Van C. Wilks

[57] ABSTRACT

In an autofocus apparatus for an imaging means such as a TV camera, an object image signal is produced by an imaging means and a focusing operation is conducted automatically by moving a focusing lens so as to maximize a high frequency component of the image signal. Automatic focusing operation is commenced only when the level of the image signal has remained smaller than the threshold value for longer than a prescribed period of time, whereby no unnecessary automatic focusing operation is conducted when the level of the high frequency component decreases because of movement of the camera or the object it is imaging.

9 Claims, 4 Drawing Sheets

FIG. 2
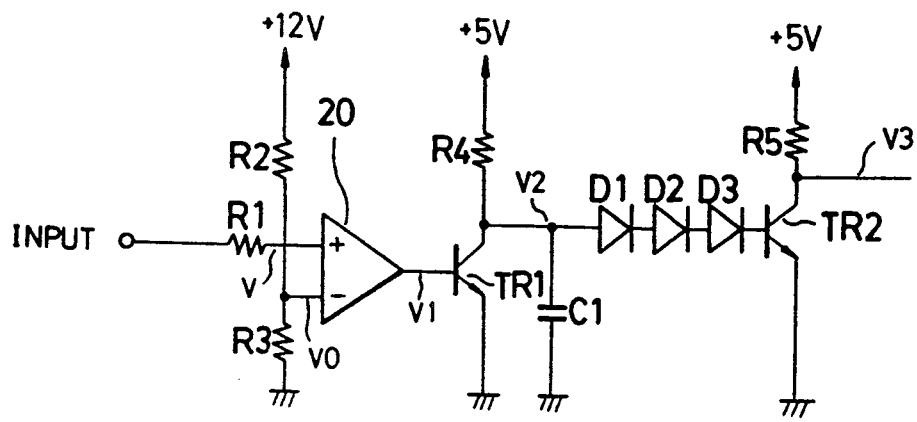
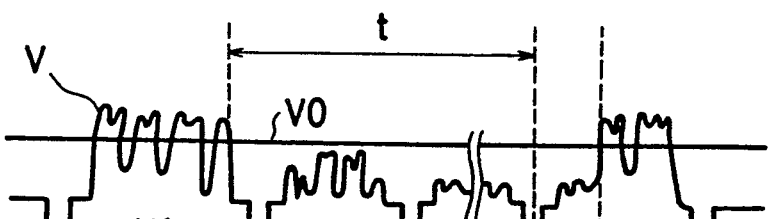
FIG. 3a
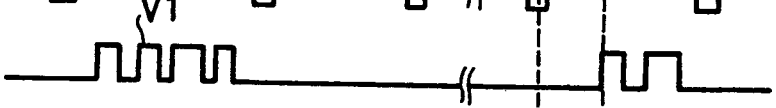
FIG. 3b
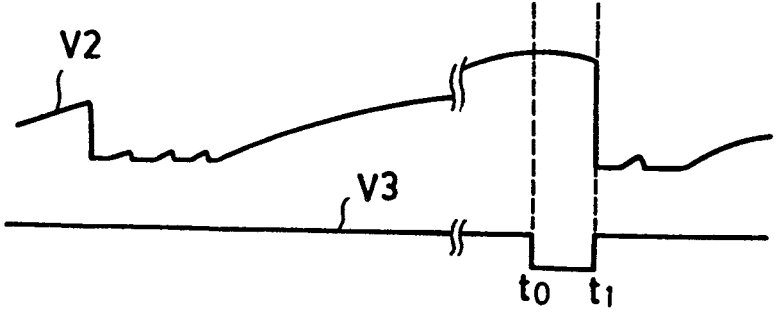
FIG. 3c
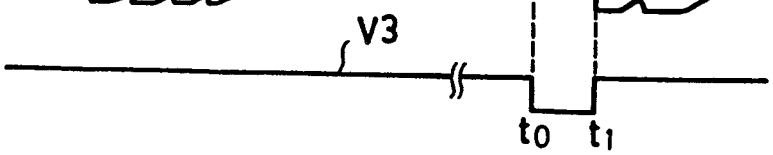
FIG. 3d

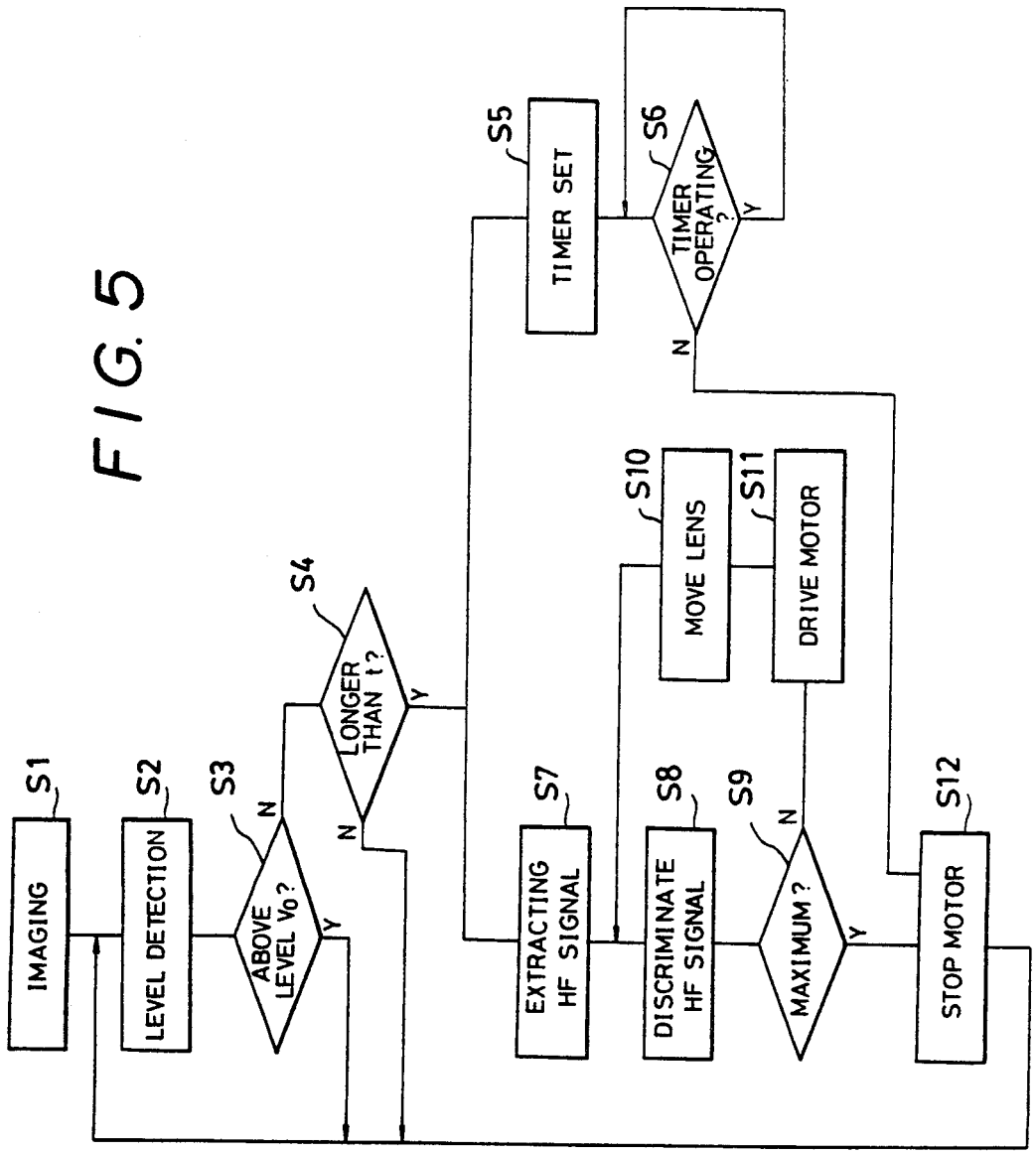

5,072,250

AUTOFOCUS APPARATUS

BACKGROUND OF THE INVENTION

1. Field of the Invention

This invention relates to an autofocus apparatus, and more particularly to an autofocus apparatus in which a focusing lens is moved to automatically conduct a focusing operation so as to maximize the high frequency component included in an object image signal produced by an imaging means.

2. Description of the Prior Art

There is known an automatic focusing method in which a focusing operation is conducted automatically by extracting a high frequency component from an object image signal produced by an imaging means (for example, a TV camera or the like) and moving a focusing lens so as to maximize the extracted high frequency component.

However, this automatic focusing method in which a focusing operation is conducted automatically by extracting a high frequency component from an object image signal produced by an imaging means (for example, a TV camera or the like) and moving a focusing lens so as to maximize the extracted high frequency component entails the problem that when the object or the camera moves, the high frequency component contained in the image signal becomes smaller, just as if the focus condition had changed. As a result, the automatic focusing operation commences in spite of the fact that the focus condition is proper, so that the picture on the monitor TV first goes out of focus and then back into focus, which is highly unpleasant to the viewer. Further, when the object is outside the focus range of the focusing lens, the automatic focusing operation is repeated endlessly because no determination that the focused state has been obtained can be made no matter how long the operation continues.

SUMMARY OF THE INVENTION

The present invention was accomplished for overcoming the aforesaid problems and its object is to provide an autofocus apparatus capable of reliably carrying out an automatic focusing operation even if the object or the camera should move.

For overcoming the aforesaid problems of the prior art, the present invention provides, in an autofocus apparatus in which an object image signal is produced by an imaging means and a focusing operation is conducted automatically by moving a focusing lens so as to maximize a high frequency component of the image signal, an improved autofocus apparatus comprising a focusing lens disposed to be movable along its optical axis for varying the focus condition of the image signal, automatic focusing operation means for discriminating the focus condition from a high frequency component extracted from the image signal and moving the focusing lens to the focused position, and discriminating means for determining the level of the image signal by comparing it with a threshold value, automatic focusing operation being commenced when the level of the image signal has remained smaller than the threshold value for longer than a prescribed period of time.

With the aforesaid arrangement, the level of the image signal is compared with the threshold value in a comparator and it is discriminated whether the level of the image signal is larger or smaller than the threshold value. When this level discrimination shows that the level of the image signal has remained smaller than the threshold value for longer than a prescribed period of time, it is judged that a deviation from the proper focus condition has occurred and the automatic focusing operation is commenced. On the other hand, a timer is set into operation simultaneously with the beginning of the automatic focusing operation and the automatic focusing operation is continued only within the period that the timer is operating.

Thus, in the present invention, the level of the image signal is discriminated by comparison with a threshold value and an automatic focusing operation is commenced when the level of the image signal remains smaller than the threshold value for longer than a predetermined period. Thus even if the object or the camera should move, the automatic focusing operation will not be started and it is therefore possible to obtain a stable focused state.

Further, the apparatus is provided with a timer and the automatic focusing operation is conducted only during the time that the timer is operating. Therefore, if the object should be outside the focus range of the focusing lens, the automatic focusing operation will not be continued endlessly but will be discontinued after a fixed period of time.

BRIEF DESCRIPTION OF THE DRAWINGS

The objects and features of the present invention will become more apparent from a consideration of the following description taken in conjunction with the accompanying drawings in which:

FIG. 2 is a schematic view of an image level detector circuit;

FIGS. 3a to 3d are output wave diagrams for explaining the operation of the apparatus according to the invention;

FIG. 5 is a flowchart showing the flow of operations for autofocus control; and

DETAILED DESCRIPTION OF THE PREFERRED EMBODIMENT

Figure 1:
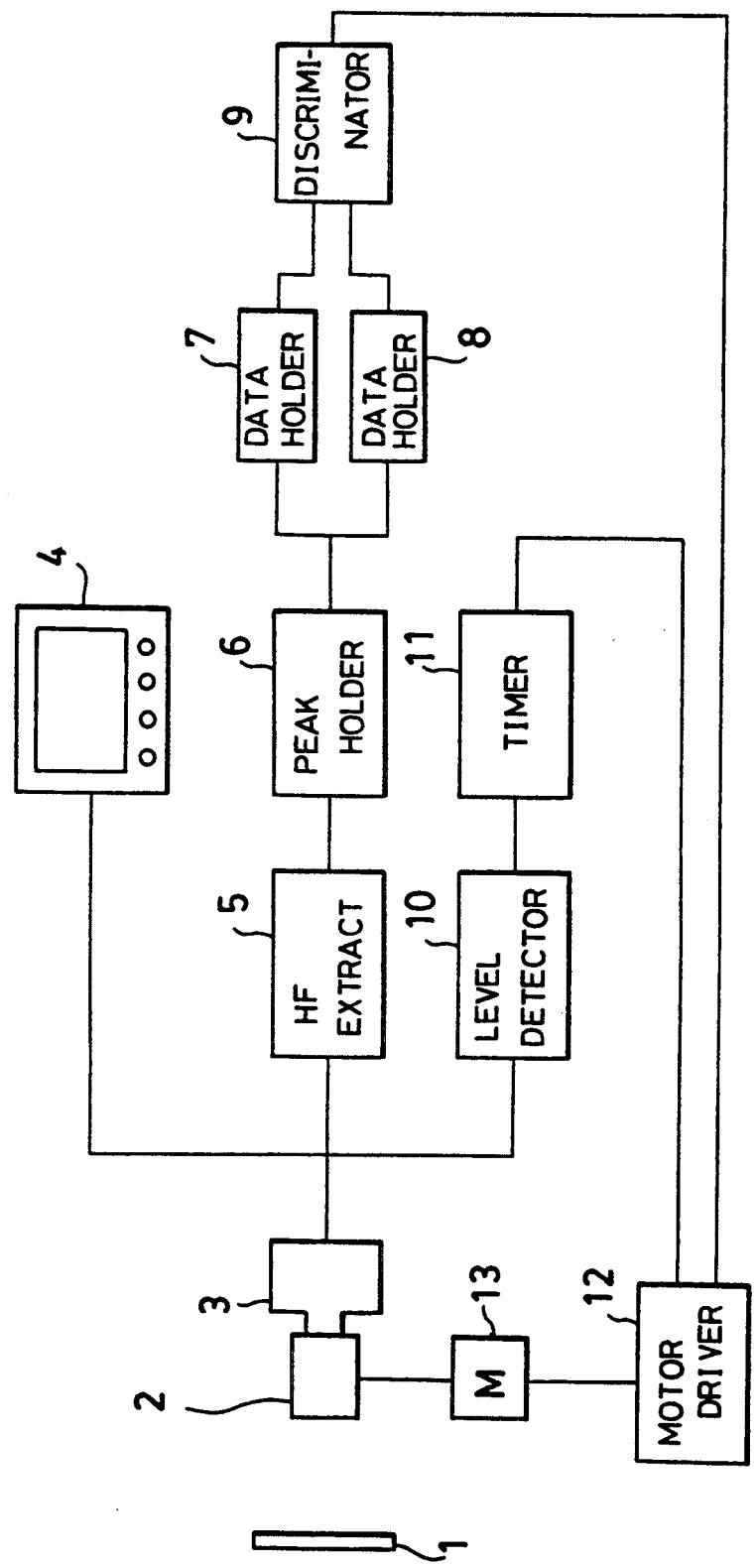
FIG. 1 is a block diagram showing the overall arrangement of the autofocus apparatus according to the invention.

The invention will now be described in detail on the basis of a preferred embodiment illustrated in the drawings.

In this embodiment the explanation will be made with respect to a support system for persons with impaired vision, in which the pages of a magazine, newspaper or the like are imaged by a TV camera and then displayed in enlarged form on a TV monitor. However, it should be understood that the invention is not limited to applications to this type of apparatus and can be applied generally as a focusing apparatus in various devices which use an imaging means to produce an image signal of an object.

The overall arrangement of the apparatus is shown in FIG. 1. An object 1 such as book or the like is imaged by a CCD (charge coupled device) camera 3 through an object and focusing lens system 2. The image signal from the CCD camera 3 is input to a monitor 4, a high frequency component extraction circuit 5 and an image level detector 10. An image of the object 1 is displayed on the monitor 4. In the high frequency component extraction circuit 5, the image signal is passed through a high-pass filter for extracting a high frequency component therefrom. The extracted high frequency component is forwarded to a peak hold circuit 6 which holds its peak value and, by means of an appropriate time constant circuit, converts the peak value to a dc voltage. A signal representing the high frequency component converted to a dc voltage is input to a data hold circuit 7 and a data hold circuit 8. The data hold circuits 7 and 8 hold the dc voltages representing the high frequency components of the image signal at two times separated by a prescribed time interval.

A magnitude discriminator 9 compares the data held by the data hold circuits 7 and 8, judges which is larger and, based on this judgment, outputs a signal for indicating the direction in which the focusing lens 2 is to be moved. It also detects the difference between the data held by the data hold circuits 7 and 8 and outputs a focus condition signal indicating whether or not the focus condition is proper. These signals are input to moving means including a motor driving circuit 12 for driving a motor 13 linked with the focusing lens and the motor 13 is driven in the forward or reverse direction in accordance with the direction signal from the magnitude discriminator 9. Simultaneously, the motor 13 is controlled so as to be stopped if it is determined from the focus condition signal from the magnitude discriminator 9 that the focus condition is proper.

The image level detector 10 is for detecting the level of the image signal output by the CCD camera 3. As shown in greater detail in FIG. 2, the image level detector 10 comprises, inter alia, a comparator 20 which compares the image signal with a threshold value determined by the ratio of the voltages across resistors R2, R3, a transistor TR1 controlled by the output signal of the comparator 20, a capacitor C1 for storing the charge applied thereto through a resistor R4 when the transistor TR1 is non-conductive, and a transistor TR2 controlled by the voltage stored in the capacitor C1.

Figure 4:
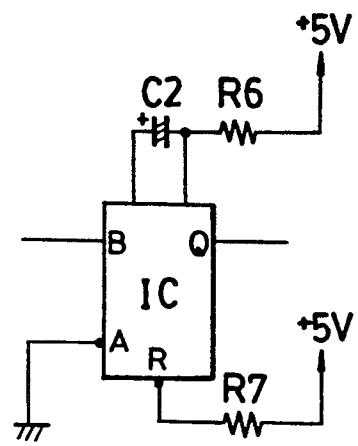
FIG. 4 is a schematic view of a timer circuit.

When it is detected in the image level detector 10 that the level of the image signal has remained smaller than the threshold value for longer than a prescribed period of time, a timer 11 is turned on. As shown in greater detail in FIG. 4, the timer 11 is constituted as a monostable multivibrator IC. When a signal is input to the B terminal of the monostable multivibrator a signal is output from the Q terminal thereof for a period of time determined by the time constant of a capacitor C2 and a resistor R6. This output signal of the timer 11 is input to the motor driving circuit 12.

The operation of the so-constituted apparatus will now be explained with reference to the flowchart of FIG. 5.

First, the object 1 is imaged by the CCD camera 3 through the object and focusing lens system 2 and the CCD camera 3 outputs a corresponding image signal. This is the state in step S1. The image signal at this time exhibits a waveform such as that indicated by V in FIG. 3a. The procedure then advances to step S2 wherein the image level is detected in the image level detector 10. Next, in step S3, it is judged whether or not the image level is greater than the threshold value and if the result of the judgment is YES, the procedure returns to step S2. If the result of the judgment is NO, the procedure advances to S4 wherein it is judged whether or not the image level has remained lower than the threshold value for longer than a prescribed period of time.

More specifically, in the image level detector 10 shown in FIG. 2, the image signal V and the threshold value $V_0$ determined by the ratio of the voltages across resistors R2, R3 are compared in the comparator 20. The result of this comparison is output by the comparator 20 as a signal $V_1$ with a waveform as shown in FIG. 3b. When the level of the image signal remains smaller than the threshold value $V_0$ (for a time period t), the voltage $V_2$ of the capacitor C1 rises as shown in FIG. 3c because of the time constant of the resistor R4 and the capacitor C1. The transistor TR2 is turned on at time $t_0$. When the transistor TR2 turns on, its collector voltage becomes low level as shown in FIG. 3d. In this way, when the image level remains smaller than the threshold value for longer than a prescribed time period, a signal indicating low image level is output. This low level signal is maintained until the image signal again becomes high level at time $t_1$.

When the result of this judgment in step S4 is that the image signal has not remained smaller than the threshold signal for longer than the prescribed time period, the procedure returns to step S2, and when the result is that it has, the procedure advances to steps S5 and S7. In step S5, the timer is set in operation. More specifically, a signal indicating that the image level is low is input to the timer 11, whereafter the timer 11 conducts a time count over a prescribed period. The procedure then advances to step S6 in which it is judged whether the timer is within its period of operation, and when this time period has lapsed, moves to step S12 in which the motor 13 is stopped.

On the other hand, the high frequency component of the image signal is extracted by the high frequency component extraction circuit 5 in step S7, whereafter discrimination is made in step S8 regarding the magnitudes of the values of the high frequency component data extracted in the preceding cycle and stored in the data hold circuit 7 and the high frequency component data for the current cycle stored in the data hold circuit 8. The procedure then moves to step S9 in which it is judged whether or not the high frequency component is maximum and when the result is NO, the procedure moves to motor driving step S11. In the motor driving step S11, the motor 13 is controlled to be driven in the direction which causes the high frequency component, as determined by the discrimination of the high frequency component magnitude in step S8, to become larger.

In step S10, the focusing lens linked with the motor 13 is moved in accordance with the manner in which the motor is controlled. Since the focus condition changes when the focusing lens is moved, whereby the magnitude of the high frequency component contained in the image signal also changes, the procedure is returned to step S8 where the magnitude of the high frequency component is again discriminated. The steps S8, S9, S11 and S10 are thus repeated in succession in this manner until the high frequency component becomes maximum. When it is found in step S9 that the high frequency component has become maximum, it is judged that the focusing lens is in its focused position and the procedure advances to step S12 in which the motor is stopped. In step S12, the motor is stopped in response to either the judgment in step S9 that the high frequency component has become maximum or the judgment in step S6 that the time period has lapsed, whichever occurs first. After the motor has been stopped in step S12, the procedure returns to step S2 and the same operations are repeated.

Figure 6:
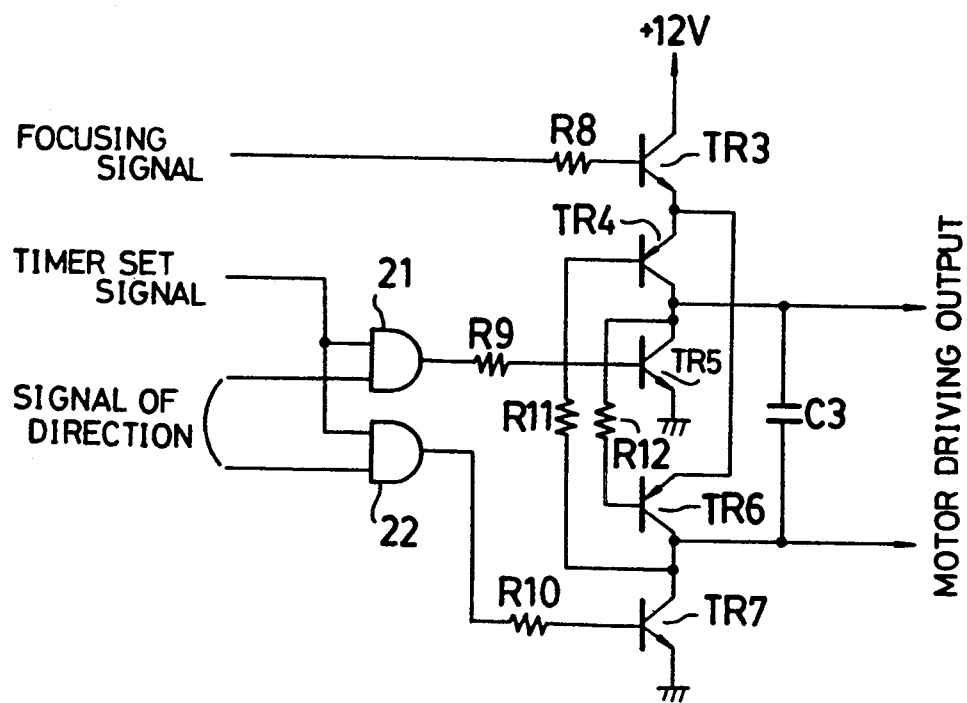
FIG. 6 is a schematic view of a motor driving circuit.

FIG. 6 shows the detailed arrangement of the motor driving circuit 12 for driving the motor 13 in the aforesaid manner. The motor driving circuit 12 is provided with AND gates 21, 22 to each of which are input the timer operation signal produced during the period that the timer 11 is operating, and the direction signal from the magnitude discriminator 9. Only in the case where it is determined from the timer operation signal and the focus condition signal that the focus is improper, one of the AND gates 21, 22 becomes conductive. That is, one of them is conductive depending on whether the direction signal is for driving the motor forward or in reverse, whereby either the transistors TR4, TR7 or the transistors TR5, TR6 are turned on. Moreover, since a transistor TR3 is turned on when the focus in improper, the transistors TR4, TR7 or the transistors TR5, TR6 are turned on, in accordance with the direction for obtaining proper focus, whereby the motor 13 is driven in the forward or reverse direction and the focusing lens 2 is moved to change the focus condition until the object becomes in focus.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention should not be limited to the particular embodiment disclosed as the best mode contemplated for carrying out the invention, but that the invention will include all embodiments falling within the scope of the appended claims.

What is claimed is:

1. An autofocus apparatus in which an image signal of an object is produced by imaging means and an automatic focusing operation is conducted automatically by moving a focusing lens so as to maximize a high frequency component of the image signal, the autofocus apparatus comprising:
   a focusing lens disposed to be movable along its optical axis for varying a focus condition of the image signal;
   automatic focusing operation means for discriminating the focus condition from a high frequency component extracted from the image signal and moving the focusing lens to a focused position; and
   discriminating means for determining the level of the image signal by comparing it with a threshold value, the automatic focusing operation being commenced only when the level of the image signal has remained smaller than the threshold value for longer than a prescribed period of time.

2. An autofocus apparatus according to claim 1, further comprising a timer which turns on when the image signal has remained smaller than the threshold value for more than a period of time, the automatic focusing operation being conducted only during the period that the timer is operating.

3. An autofocus apparatus according to claim 2, further comprising means for discriminating the focus condition on the basis of the high frequency component extracted from the image signal, the automatic focusing operation being stopped in response to either a judgment that proper focus has been obtained or a judgment that the timer operation has stopped, whichever occurs first.

4. An autofocus apparatus, comprising: optical means including a lens movable along its optical axis for focusing an optical image of an object on an image plane; imaging means for receiving the image from the image plane and generating a corresponding electrical image signal in response thereto; determining means responsive to the electrical image signal for determining and generating a focus condition signal representative of the focus condition of the image; moving means for moving the lens in response to both the focus condition signal and a focus operation signal to adjust the focusing of the image to effect a focusing operation; and discriminating means receptive of the electrical image signal for discriminating whether the focusing operation should commence by comparing the image signal with a predetermined threshold value, and generating the focus operation signal in response thereto.

5. An autofocusing apparatus according to claim 4, wherein the discriminating means includes means for determining a value of the electrical image signal for comparison with the predetermined threshold value, and means for determining the commencement of the autofocusing operation only when the value of the image signal is smaller than the threshold value for a duration longer than a predetermined value.

6. An autofocusing apparatus according to claim 5, wherein the discriminating means includes timing means for determining a duration from the commencement of the autofocusing operation and generating the focus operation signal in response thereto, whereby the autofocusing operation continues only while the duration is less than a predetermined time period.

7. An autofocusing apparatus according to claim 6, wherein the automatic focusing operation means includes stopping means to determine when the image is in focus for stopping and autofocusing operation in response thereto.

8. An autofocusing apparatus according to claim 4, wherein the imaging means includes a CCD camera.

9. An autofocusing apparatus according to claim 4, wherein the autofocusing operation means includes high frequency extraction circuit means receptive of the image signal for extracting high frequency components of the image signal, peak hold circuit means for holding peaks of the high frequency components and converting the peaks to a voltage, first data holder means for holding the voltage during a first duration, second data holder means for holding the voltage during a second duration, and magnitude discriminator for comparing the voltage held by the first data holder and the voltage held by the second data holder and generating the focus condition signal in response thereto.

* * * * *